US006411952B1

(12) United States Patent
Bharat et al.

(10) Patent No.: US 6,411,952 B1
(45) Date of Patent: Jun. 25, 2002

(54) METHOD FOR LEARNING CHARACTER PATTERNS TO INTERACTIVELY CONTROL THE SCOPE OF A WEB CRAWLER

(75) Inventors: Krishna Asur Bharat, Santa Clara, CA (US); Robert Chisolm Miller, Pittsburgh, PA (US)

(73) Assignee: Compaq Information Technologies Group, LP, Houston, TX (US)

( * ) Notice: Subject to any disclaimer, the term of this patent is extended or adjusted under 35 U.S.C. 154(b) by 0 days.

(21) Appl. No.: 09/103,904

(22) Filed: Jun. 24, 1998

(51) Int. Cl.$^7$ ............................................... G06F 17/30
(52) U.S. Cl. ............................................. 707/5; 707/10
(58) Field of Search ............................... 707/1–6, 9, 10, 707/102, 501.1; 706/45, 46, 47, 48; 709/224, 219, 249

(56) References Cited

U.S. PATENT DOCUMENTS

| | | | | | |
|---|---|---|---|---|---|
| 5,826,254 A | * | 10/1998 | Kahn | ............................. | 707/5 |
| 5,832,212 A | * | 11/1998 | Cragun et al. | ............... | 713/202 |
| 5,898,830 A | * | 4/1999 | Wesinger, Jr. et al. | .. | 395/187.01 |
| 5,899,985 A | * | 5/1999 | Tanaka | ......................... | 706/45 |
| 5,963,940 A | * | 10/1999 | Liddy et al. | ..................... | 707/5 |
| 5,987,611 A | * | 11/1999 | Freund | ....................... | 713/201 |
| 5,999,664 A | * | 12/1999 | Mahoney et al. | ........... | 382/305 |
| 6,009,475 A | * | 12/1999 | Shrader | ....................... | 709/249 |
| 6,029,182 A | * | 2/2000 | Nehab et al. | ................ | 707/523 |
| 6,088,524 A | * | 7/2000 | Levy et al. | .................. | 395/603 |
| 6,112,021 A | * | 8/2000 | Brand | ................... | 395/500.23 |

OTHER PUBLICATIONS

Oren Etzioni "The World–Wide Web: Quagmire or Gold Mine?", ACM 1996, pp. 65–68.*

Chen et al "WebMate: A Personal Agent for Browsing and Searching", Autonomous Agent 1998, pp. 132–139.*

Wood et al "Iterative Refinement by Relevance Feedback in Content–Based Digital Image Retrieval", ACM Multimedia 1998, pp. 13–20.*

"Hotcargo Express" by Documagix http://www.documagix.com/products/hotcargo_express/, Pulled Jun. 23, 1998.

"Fact Sheet MacrBot™", http://www.ipgroup.com/macrobot/. Pulled Jun. 23, 1998.

"Machine Learning Online" (c)Kluwer Academic Publishers, 1986.

Goan et al., "A Grammar Inference Alogrithm for the World Wide Web" No Date.

Belew et al., "Machine Learning and Information Retrieval" rik@cs.ucsd.edu and shavlik@cs.wisc.edu Last modified 1996.

Nix et al., "Editing by Example" Association for Computing Machinery, pp 601–621 1985 Oct. 1985.

Norvig et al., "Artificial Intelligence A Modern Approach" Prentice Hall, pp 531–544, No Date.

Maarek et al., "Web Cutter: A System for Dynamic and Tailorable Site Mapping" Hyper Proceedings 6th Internat'l WWW Conf., No Date.

Quinlan et al., "C4.5: Programs for Machine Learning" http://www.mkp.com/books_catalog/2380toc.htm Pulled Jun. 23, 1998.

* cited by examiner

*Primary Examiner*—Safet Metjahic
*Assistant Examiner*—Uyen Le
(74) *Attorney, Agent, or Firm*—Pennie & Edmonds LLP

(57) ABSTRACT

A method controls a Web search for server computer resources by an end-user Web crawler. Each resource, such as a Web page, is located by a resource address specified as a character string. The end-user defines a scope for an initial Web search by settings. The settings are used to search the Web for resources limited by the scope. The set of resources located during the search are rendered on output device, and positive and negative examples are selected from the set of resources to infer a rule. The rule is displayed, as well as a subset of resources that match on the rule. The selecting, inferring, and rendering steps are repeated while searching until a final rule is obtained. The rule matches resources that the crawler should process and does not match resource that it should avoid.

66 Claims, 6 Drawing Sheets

METHOD FOR LEARNING CHARACTER PATTERNS TO INTERACTIVELY CONTROL THE SCOPE OF A WEB CRAWLER

FIELD OF THE INVENTION

This invention relates generally to Web crawlers, and more particularly to learning character patterns in queries to control the scope of Web crawler searches for Web pages.

BACKGROUND OF THE INVENTION

In the context of the Internet and the World Wide Web (Web)—an application layer of the Internet, Web crawlers are software programs that search for resources, such as Web pages, by following hyperlinks that connect the pages. This activity is sometimes known as "walking" the Web. Search services, such as Digital Equipment Corporation's AltaVista service employ Web crawlers to build indexes of words contained in the pages located by the search. Typically, the scope of the search is specified in a query.

In general, prior art Web crawlers search and walk the Web without much discrimination on where the pages are located. The location or address of each Web page is specified by a string of characters called a Universal Resource Locator (URL), e.g., "http://www.digital.com/homepage/topic/topic.html". Hyperlinks are URLs embedded in Web pages to identify connected or "linked" pages. Potentially, the scope of most prior art Web crawlers is the entire Web. During a search, the links are followed to locate as many connected pages as possible.

On the other hand, an end-user crawler performs custom searches on behalf of an end-user. For example, an end-user crawler may locate and copy a subset of pages to a local disk. End-user crawlers have a restricted scope and typically walk only a small portion of the Web. For example, an end-user crawler may confine its walk to a single domain or "host" computer. That is, the scope of the search is restricted to a single or small number of sites.

Customizing an end-user crawler involves, in part, specifying the portion of the Web to be walked, that is, the scope of the search. This specification can be called a walking rule. It is possible to program very effective walking rules based on the URL character strings alone. Unfortunately, even this amount of programming is too complicated for many end-users.

In another approach, the search scope is manually defined. However, hand coded rules are tedious to write, error-prone and often sub-optimal. Learning walking rules from examples is another possibility. Users typically are incapable or unwilling to provide enough examples to infer a perfect walking rule, i.e., a rule that exactly matches the desired crawl scope.

Several end-user crawlers provide broad control on crawl scope. The MacroBot crawler (http://www.ipgroup.com/macrobot/) does not have restrictions on individual pages. However, it supports limits on depth or number of pages retrieved.

The Mapuccino/WebCutter crawler (http://www.ibm.com/java/mapuccino/) supports page restriction based on keyword matching with the textual content of the document. This approach can be time consuming, because pages have to be fetched before it can be decided whether or not the content of pages are useful to the end-user. Also, content-based walking rules do not exploit syntactic patterns in the character strings that name URLs within a given site.

The HotCargo Express crawler (http://www.documagix.com/products/hotcargo_express/) uses regular expressions to identify the URLs of pages that should be downloaded. However, the regular expressions need to be hand-coded.

There are prior art methods for inferring grammars and regular expressions in character strings from examples, such as in natural language processing. These inference methods are designed to work on a large training set without the need for much generalization.

These methods do not usually make use of negative examples, i.e., character strings that specify portions of the Web not to be searched. The grammars learned there are usually too complex to be understood or edited by end-users. Hence, given small set of examples that users are likely provide, the prior art natural language processing might not work well.

Some methods attempt to infer a regular grammar from positive examples in the context of specific types of Web content, e.g., phone numbers or e-mail addresses in Web pages. These methods assume a large training set and learn patterns that are hard for humans to verify or edit, see Goan et al. "A Grammar Inference Algorithm for the World Wide Web", AAAI Spring Symposium, 1996, (http://www.parc.xerox.com/istl/projects/mlia/papers/goan.ps). Please see "http://www-cse.ucsd.80/users/rik/MLIA.html for a listing of work in applying machine learning to information retrieval.

Another approach to rule learning uses a decision tree. There, a tree of decision nodes is constructed from training data based on various attributes. For each node in the tree, an attribute is tested. Based on the result of the test, either a "yes" or "no" result is returned, or the decision process moves to a descendant node in the tree, where another attribute is examined similarly. In constructing such a tree, when a new node is added, the method chooses the attribute which is likely to yield the largest information gain at that stage.

An example of such a method is described by Quinlan in "Induction of decision trees," Machine Learning, Vol. 1, pp. 81–106, 1986. For an overview of Decision Tree learning see Russell et al in Section 18.3 of "Learning Decision Trees," Artificial Intelligence: A Modern Approach Prentice Hall Series in Artificial Intelligence, 1995.

Decision tree learning is optimized to learn trees that are either concise in their description using a "minimum description length" optimization, or are fast to evaluate. Neither of these optimizations are important criteria in the context of Web crawlers. The time required to fetch and process Web pages significantly exceeds the time required to match URLs. The decision trees learned by these methods tend to be highly nested and hard for end-users to comprehend or modify.

None of the known learning and grammar inference methods can be "tuned" to match the characteristic textual grammar of URLs. Hence, none of them incorporate biases specified in URLs.

Hence, an automated approach to generating walking rules is desirable. One goal of such an automated approach would allow end-users who are non-programmers to interactively train a crawler to walk a specific portion of the Web by giving a small set of simple examples. From the training set, a walking rule would be inferred that is comprehensible to the end-user. Then, the user could modify the input or the rule directly, to develop a walking rule that better matches the desired crawl scope. Thus, the second goal is to specifically generate rules that are comprehensible to end-users, and to support iterative refinement. The third goal is to tune the rule inference to the specific domain of URLs and exploit knowledge about URL naming. Hence, in building a walking rule based on character patterns, the system could preferentially select patterns that match actual structures of character strings that specify a target Web site, such as directories, paths, filenames and file-extensions typically found in URLs.

SUMMARY OF THE INVENTION

The invention as a first goal provides a method for interactively training a Web crawler to search the Web according to a desired scope. During training, input comprises of examples of URLs that should be walked (positive examples) and not walked (negative examples) by the crawler. This input is used to infer a walking rule.

Users typically are incapable or unwilling to provide enough examples to infer a perfect walking rule, i.e., a rule that exactly matches the desired crawl scope. Hence, it is preferable that the inferred rule is comprehensible to the end-user. This allows the user to modify the input, or the rule directly, and to develop a rule that better matches the scope of the desired crawl. Thus, a second goal is to specifically generate rules that are comprehensible to end-users, and to support iterative refinement.

The third goal is to allow the user to tune the rule inferred to a specific domain of URLs, and to exploit knowledge about URL naming. Hence, in building a rule based on patterns, the system should preferentially select patterns that match actual data structures on the target Web site, such as directories, paths, filenames and file-extensions.

Therefore, a search for Web resources according to a rule includes the step of defining a scope for an initial Web search by supplying settings. The settings limit the scope of the search to produce a set of qualifying resources. Positive and negative examples are selected from the set, and a rule is inferred from the selected examples. The rule is rendered, as well as the subset of resources that match the rule. The selecting, inferring and rendering can be repeated while searching the network.

DETAILED DESCRIPTION OF PREFERRED EMBODIMENTS

Introduction of an Interactive Web Crawler

Figure 1:
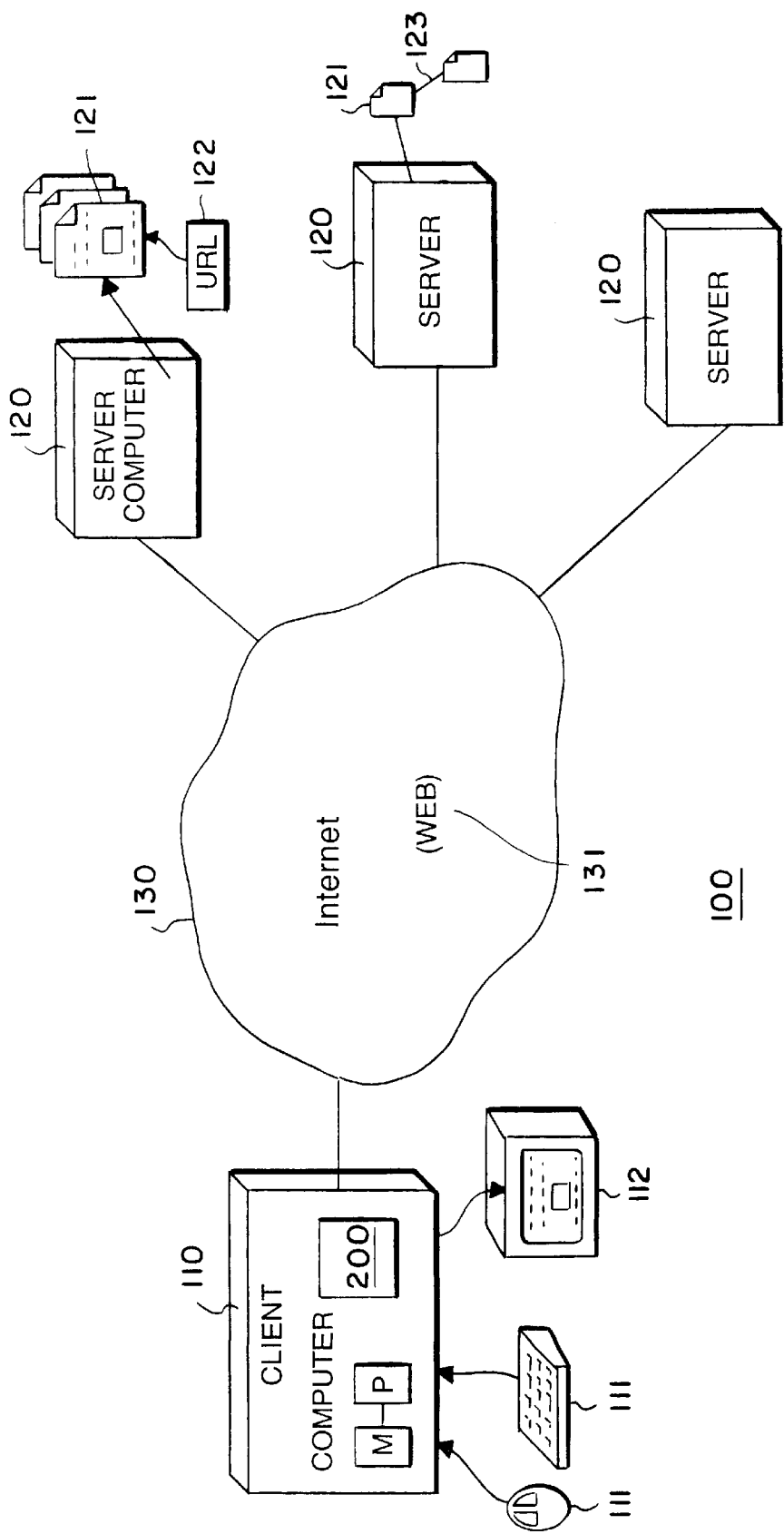
FIG. 1 is a block diagram of a distributed computer system that uses the controlled Web crawler according to invention.

FIG. 1 shows a distributed system 100 that uses a Web crawler trained according to the invention. A client computer 110 is connected to server computers 120 via a network 130. The client computer 110 includes input devices 111, for example, a mouse and a keyboard, and an output device 112 such as a display terminal. The client 110 includes a memory (M) and a processor (P) for storing and executing software programs. One of the programs that can be executed by the client computer 110 is an end-user Web crawler 200. The invention can be worked as a modification of the crawler 200. The detailed method steps of the invention can be implemented as an "applet," or Java code. In actual practice, the network 130 connects to many client and server computers.

The server computers 120 store Web pages 121 according to Universal Resource Locators (URLs) 122. The URLs 122 are specified as characters strings. Some of the pages 121 can include links 123 to other pages. The servers 120 are accessed via the network 130, for example, the Internet. The Internet includes an application level interface called the World Wide Web (the "Web") 131. Communication requests and replies between the client 110 the servers 120 are conducted using the HyperText Transport Protocol (HTTP). The syntax of character strings used in HTTP requests and replies are well known.

The invention enables an end-user of the client computer 110 to interactively train the crawler 200 to "walk" a required portion of the Web. The methods described below infer a rule for walking from an example set of URLs, these basically are character strings. The example set of URLs include positive examples of URLs that should be walked, and negative examples of URLs that should not be walked.

The invention provides feedback to the user by rendering the walking rule in a human readable format on an output device, and by displaying the scope of the rule that was inferred. The user can edit the set of example URLs, and the walking rule until a rule with satisfactory scope is generated.

Interactive Learning Steps

Settings

Figure 2:
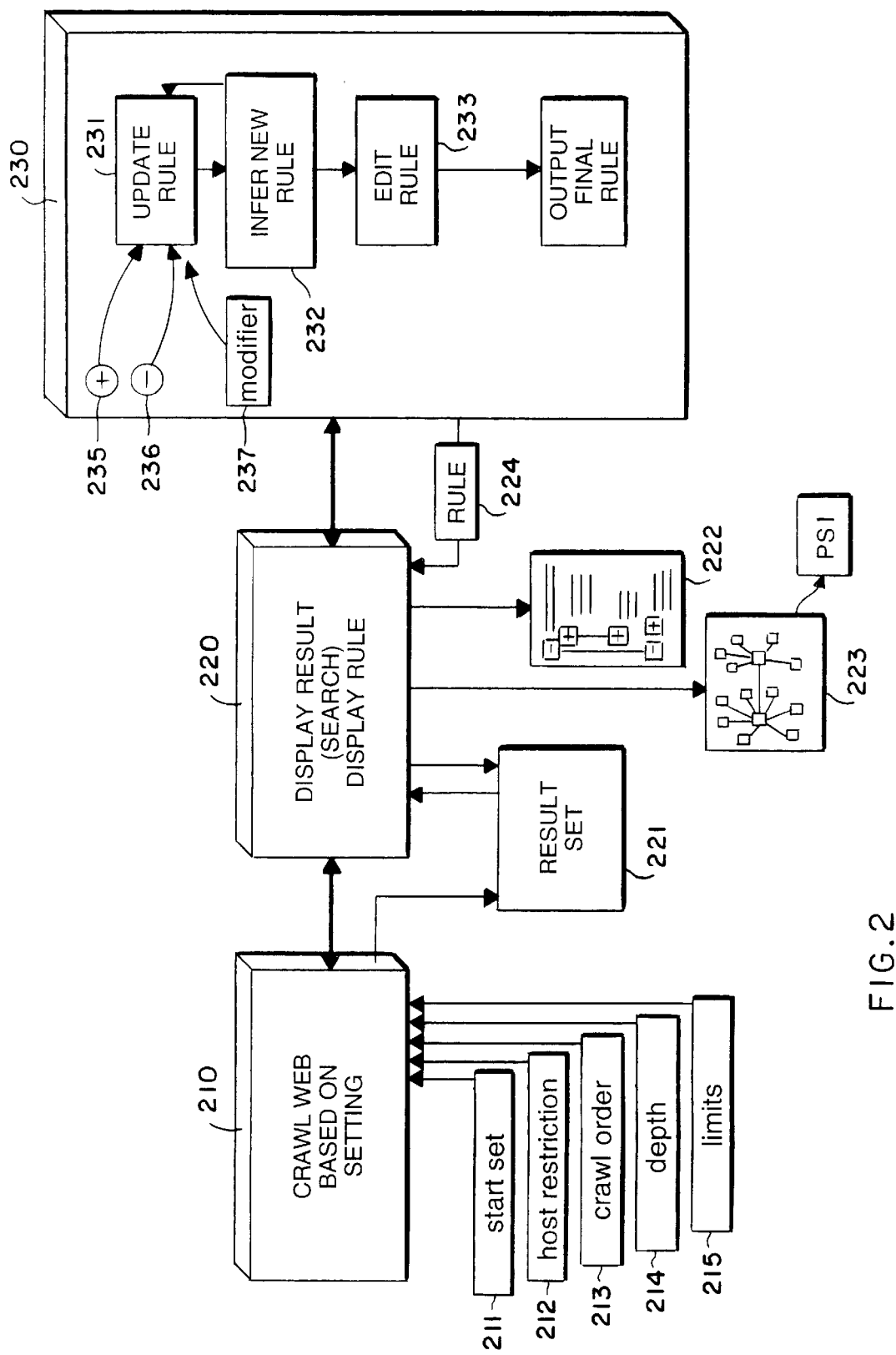
FIG. 2 is a flow diagram of a method for learning a walking rule that can be applied to the system of FIG. 1.

FIG. 2 shows the steps involved in training the crawler 200. In step 210, the crawler 200 initially searches the Web according to end-user specified crawl settings 211–215. The crawl settings include a start set 211, a host restriction 212, a crawl order 213, a depth 214, and number of resource limits 215.

The start set 211 specifies the set of URLs at which the walk should start. The host restriction 212 is an optional constraint that specifies if the crawler 200 should only walk URLs on a particular host computer 120, i.e., "site." The crawl order 213 specifies whether the walk should be done in breadth-first or depth-first order. The depth 214 specifies how many links should be followed when following hyperlinks. The optional resource limit 215 specifies how many URLs should be considered.

Training Walk to Get Initial Result Set to Display

After the settings 211–215 have been specified, an initial "training" crawl is performed based on the user supplied settings. The initial search produces a result set 221. The result set includes the set of resources that are located according to the scope limited by the settings. The training crawl can be performed concurrent with the following steps. That is, as a walking rule 224 is iteratively defined, the result set 221 can accordingly be updated and displayed.

In step 220, the crawler 200 renders the result set 221 of the training crawl. The results set can be displayed in outline view 222, or as a connectivity graph 223. Other forms of rendering the result set 221 are also possible. The outline 222 or graph 223 show the connectivity between the Web pages of the result set 221. It is also possible to show page-specific information (PSI), such as the title of the page, the URL, or a summary of the Web page. This page-specific information should be sufficient for the user to discern whether or not the desired walking rule is adequately scoped.

Specifying Positive and Negative Examples and Scope

Step 230 deals with learning and refining the walking rule 224. In sub-step 231, the user labels (selects) pages of the result set 221 as positive examples 235, or negative examples 236 to update the rule. Note, initially, until the user gives some direction, there may not be a rule. As the training of the crawler proceeds, this labeling or selecting can be repeated.

At this point, the user can specify a "modifier" 237 for the scope of the walking rule. For example, the scope modifier 237 can range from "most general" to "most conservative." The scope modifier 237 can be stored in the crawler 200 as two integer variables $\alpha$ and $\beta$. The ratio $\alpha/\beta$ determines the degree of generalization. That is, these two integers are tuning parameters for rule inference, as discussed below.

Inferring a Walking Rule

After the user has labeled the positive and negative example 235–236, specified the scope modifier 237, as well as the settings 211–215, the walking rule 214 can be inferred in sub-step 232. The steps to make this inference are described below.

If there are no host restrictions, then the rule is of the form:

Walk URLs that match ONE of the following sequences: {P1 ... Pn} and DO NOT match ONE of the following patterns {N1 ... Nm}, where {P1, ..., Pn} and {N1, ..., Nm} are sets of character patterns in one of the following six formats:

(1) A   (2) *   (3) A*
(4) *B   (5) A*B   (6) *A* and, where "A" and "B" represent constant character strings, and "*" represents some arbitrary pattern of characters, including none. The set {P1, ..., Pn} is the set of positive patterns, and the set {N1, ..., Nm} is the set of negative patterns.

For instance, an example of a pattern of the form A*B is:
"www.yahoo.com/*/Indices/"
where A="www.yahoo.com," and B="/Indices/" which matches URLs such as:
"www.yahoo.com/Arts/Art__History/Indices/," and
"www.yahoo.com/Science/Earth__Sciences/physics/Indices/"
where the bold characters are the arbitrary character sequences "*."

When there is a restriction that limits the crawl to a host "H" the rule is of the form:

Walk URLs on the host: H, where the rest of the URL matches ONE of the following patterns: {P1 ... Pn} And DOES NOT match ANY of the following patterns {N1 ... Nm}, where {P1, ..., Pn} and {N1, ..., Nm} are patterns in the previously described format. The patterns are matched against the path of the URL in this case.

Below, a motivating example and the steps for inferring rules are provided. Note, sub-step 232 is guaranteed to produce a walking rule in the above format, since a trivial rule is always possible, e.g., the rule in which {P1, ..., Pn} is the set of positive examples given by the user, and {N1, ..., Nm} is empty.

The current inferred rule 224 is rendered by step 220, for example, on the output device 112. The pages that match on the rule 224 can be marked or emphasized in the display. In particular, by emphasizing URLs that were not given as examples but still match on the rule, the user can understand the scope of the rule 224. The rule 224 is shown in a format that makes it possible for the user to edit the rule in sub-step 233.

Representing Patterns

A simplified presentation of the six pattern formats can be:

(1) Match any URL that equals A,
(2) Match any URL,
(3) Match any URL that begins with A,
(4) Match any URL that ends in A,
(5) Match any URL that begins with A and ends with B, and
(6) Match any URL that contains A.

By studying the effect of the rule 224 on the result set 221, the user can select different positive and negative examples in sub-step 231 to update the rule, or the rule can be edited directly in sub-step 233. As the rule is refined, the searching and rendering can be repeated in an interactive manner.

Rule Editing

The constant sting(s) that are displayed as part of the rule 224 can be edited by the user in sub-step 233. The user may also add or delete from the list of positive and negative patterns. After such an edit happens, further rule inference from examples can be disabled by the user interface to prevent the direct edits from being lost. When disabled, sub-step 232 is not performed. The above steps can be repeated until a final rule is produced.

Motivation for Rule-Based Interactive Control of Web Crawler

Experience gained by building customized Web crawlers by hand has shown that URL character strings often provide enough information to identify hyperlinks that need to be walked. It is possible to use URL patterns (syntactic constraints on URLs) to construct a rule to walk the Web in a specific way.

An example of such a URL pattern is one that constrains the host name contained in the URL to have a particular value. This constraint forces the crawler 200 to stay within a specific site, e.g., "www.yahoo.com." In the case of the Yahoo! site, the above example avoids links to secondary services provided by Yahoo!, such as: "search.yahoo.com," "my.yahoo.com," "weather.yahoo.com," "yp.yahoo.com," and external links to sites such as: "www.bguide.com."

However, if the intent is to only walk the hierarchy of Yahoo! categories, then pages connected by the following links are not avoided:

"www.yahoo.com/M=b388.Y1.1/D=yahoo/S=0:N/A=16512/?http://www.yahoo.com/promotions/datek/index.html,"

"www.yahoo.com/M=Y40.Y14C.1.1/D=yahoo/S=74294:S/A=16647/RedirectID=0/?http://www.zdnet.com," and "www.yahoo.com/homea/?http://yp.yahoo.com/yahoo/yp.html," or "www.yahoo.com/homet/?http://tennis.yahoo.com/ten/".

From these examples, a walking rule of the form:

Walk URLs on the host: www.yahoo.com Where the rest of the URL matches ONE of the following patterns: {*} And DOES NOT match ANY of the following patterns {homea/*, homet/*, M=*} may be inferred.

The above example involves prefix URL patterns, that are patterns that require a constant prefix in the URL. These patterns select or deselect a specific sub-tree in the space of possible URLs. The sub-tree may correspond to a sub-directory on the URL's host in some cases.

It is also useful to have suffix patterns such as:

"*/personal/resume. html,"
  "*.gif," and
  "*.cgi."

Two other variants may also be useful. First, patterns that involve both a prefix and a suffix (prefix-suffix patterns) e.g., "www.research.digital.com/SRC/staff/*/bio.html," and second infix patterns that match a constant string anywhere in the URL, e.g., "*/info/*."

These patterns are sometimes known as "gap" patterns. Gap patterns are simple regular expressions involving only constant character strings and wildcards, please see Nix "Editing by Example," ACM TOPLAS, 7(4) pp. 600–621, October 1985.

Rule Inference

Figure 3:
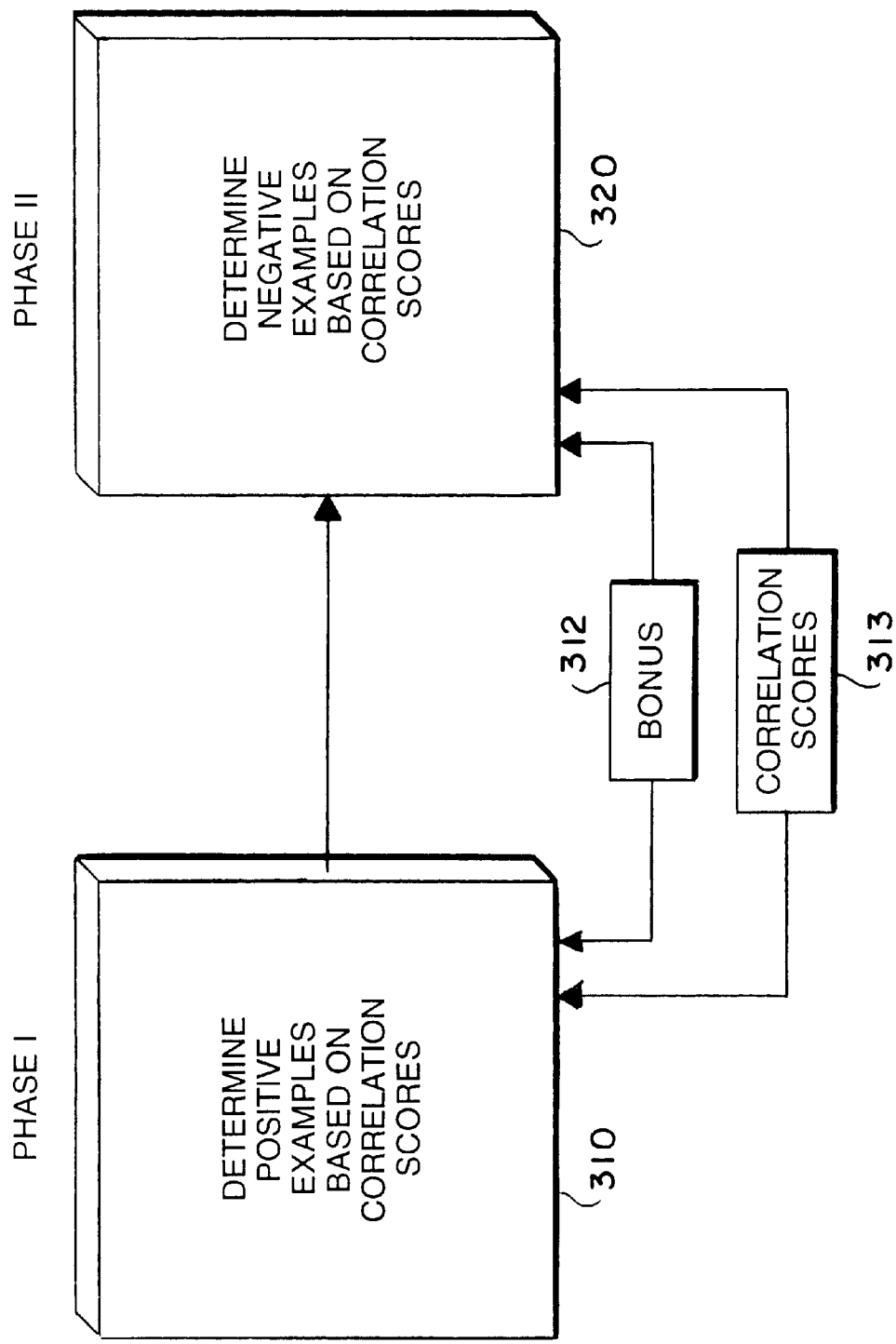
FIG. 3 is a block diagram of two phases used by the method of FIG. 2.

Given a set of positive and negative examples of URLs or URL paths, the method for determining the walking rule involves two phases 310 and 320 as shown in FIG. 3.

Phase I: Determining Positive Examples

In the first phase I 310, the inference sub-step 232 determines a rule that will match on all positive patterns, and as few negative examples as possible. The matching patterns are selected in a greedy fashion based on correlation scores 313. The correlation scores 313 of a pattern measures well the pattern matches the examples it needs to match, without matching those it should not. In calculating the scores, the examples matched by previously chosen patterns are not counted. Alternative methods for determining correlation scores are described below.

In each iteration of the greedy pattern matching, the pattern with the highest correlation score is added to the set of positive patterns. After every positive example is matched by at least one pattern in the set, the first phase is concluded.

Assigning Correlation Scores

The correlation score 313 for a particular pattern is:

$$\alpha \times positives - \beta \times negatives + bonus, \quad [1]$$

where $\alpha$ and $\beta$ are the integer values 237 of FIG. 2 that modify the scope of the search, and bonus 312 are "points" added to break ties, see below for implementation details. Here, positives is the set of positive examples that are matched by the current pattern but by none of the previously selected patterns. Negatives is correspondingly the number of negative examples matched.

The correlation scores 313 are defined for a correlation set. This set includes the positive and negative examples that are not matched by the current set of positive patterns.

The integer values $\alpha$ and $\beta$ are used to control the relative importance of matching positive and negative examples while determining the correlation scores 313. If $\alpha$ and $\beta$ are non-negative, then the ratio $\alpha/\beta$ determines how broad the selected pattern is. If $\beta$ is zero, then the most general pattern will be chosen. The most general pattern is the null pattern which matches all examples.

As the ratio of $\alpha/\beta$ decreases, the rule inference will become more and more conservative. Setting $\alpha$ to be slightly greater than $\beta$ appears to work well, e.g., $\alpha=5$ and $\beta=4$ yields a moderately conservative scope.

To break ties, bonus points 312 in the range (0 . . . 1), are used to bias the selection towards patterns that define useful subdivisions of the possible URLs. Bonus points are used to incorporate other biases as well, such as preferring prefix patterns to suffix patterns, and preferring either of these to other patterns. The details of how bonus points are "earned" during the learning phases are described below.

The specific steps used to generate candidate patterns, also described below, restricts the possible patterns to meaningful sub-parts of slightly less than arbitrary character strings used by the crawler during its search, namely strings that locate universal resources on the Web, e.g., pages.

Initially the correlation set includes all the examples. All possible patterns for the examples is the union of the sets of patterns derivable from any of positive examples in the correlation set. The user can optionally restrict the set of applicable pattern-types to a subset of prefix, suffix, infix and prefix-suffix patterns.

The generating of candidate patterns from this space is described in the next section. In each iteration, the candidate pattern with the highest correlation score is chosen. The positive and negative examples matched are eliminated from the correlation set. This process is repeated until all positive examples are eliminated from the correlation set.

Phase II: Determining Negative Examples

In phase II 320, the correlation set is initialized to include all examples matched in Phase I, that is, both positive and negative matched by the positive pattern set. During each iteration, candidate patterns are derived from the negative examples remaining in this set. The value $\alpha$ is set to infinity ($\infty$), and $\beta$ to $-1$.

The pattern with the highest correlation score is selected as in phase I, and added to the negative pattern set. In this phase, no positive examples are ever matched because that would cause the correlation score to go to $-\infty$. During this phase, only patterns that match the negative examples of the first phase are matched.

The method is guaranteed to produce a solution as long as no example is labeled as both positive and negative. In the worst case, all example strings will be used as patterns. Even when both $\alpha$ and $\beta$ are 0 in phase I, every iteration is guaranteed to reduce the positive examples in the correlation set by at least one. This is true because the patterns are derived solely from unmatched positive examples. A similar argument proves that phase II will terminate. The two phases will jointly take at most n phase I iterations plus m phase II iterations.

Implementation Details

Generating Candidate Patterns

During any given iteration, a particular set of example strings is used to generate patterns using only the allowed pattern formats (orderings)—prefix, infix, suffix, prefix-infix. Patterns corresponding to the whole string and the null pattern may be considered as degenerate cases of one of the pattern formats, e.g., prefix.

Not every pattern that can be derived in the above manner will necessarily be useful, e.g., given:

"www.xyz.com/~/jones/bio.html," and
"www.foo.bar/games/backgammon.htm"

as examples, the pattern *es/o* may suggest itself, but this pattern is not very useful. While such patterns may concisely match the examples given, they do not constitute useful generalizations, and will behave poorly in predicting the relevance of other URLs.

Given a small number of examples, the risk of making such spurious generalizations is high. To avoid this, the set of candidate patterns is restricted to those that represent a useful segmentation of the URLs from which the patterns were derived from, i.e., only those patterns that break the URL character string at specific transition points. In other words, the evolving syntax of the grammar applied to character strings to form URLs is exploited by the invention.

Generating Tokens from a URL string Using Transition Points

Figure 4:
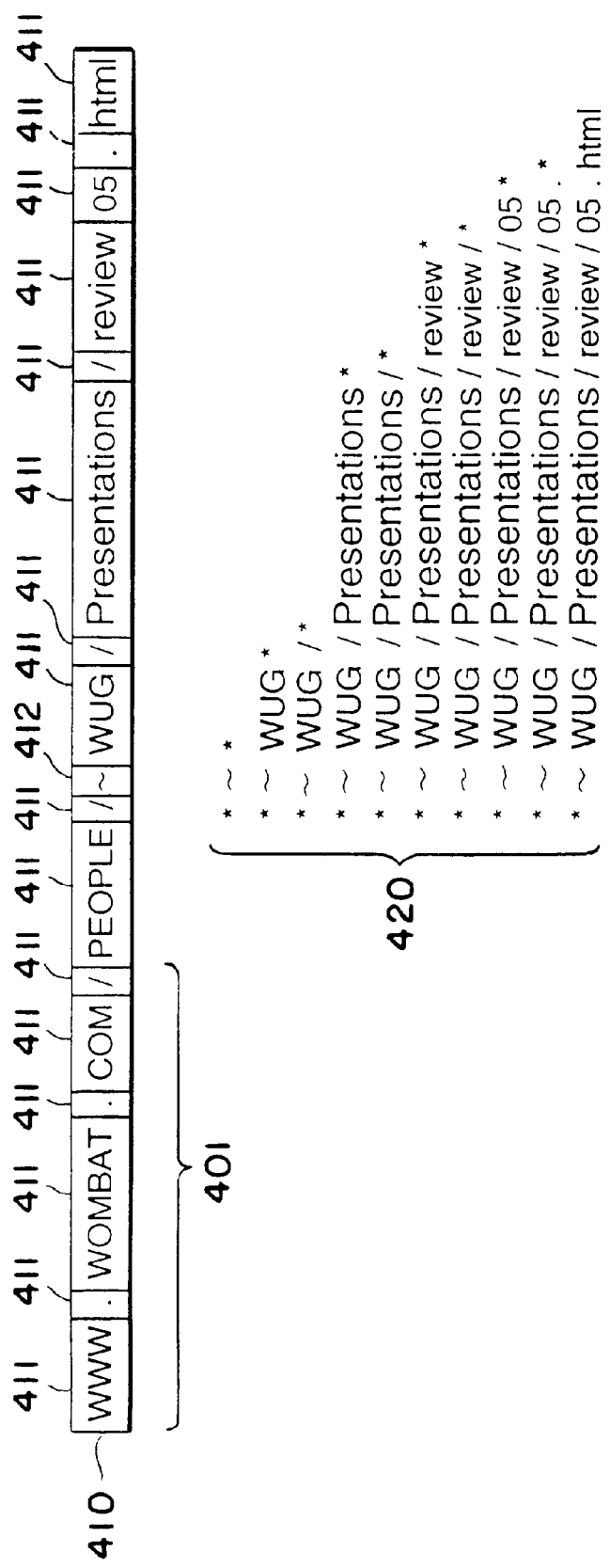
FIG. 4 shows how a character string specifying the address of a Web page can be partitioned into tokens.

FIG. 4 shows the decomposition of a URL character string 410 into tokens 411 at transition points. FIG. 4 also shows the enumeration of candidate infix patterns 420 from the tokens starting with the character '~' 412 itself a token; the characters 401 indicate a specific site or host.

Transition points are determined as follows. All characters are placed in sets of equivalence classes. Uppercase characters, lowercase characters, and numeric characters form three separate equivalence classes. Every other non alpha-numeric character is a fourth equivalence class. In other words, each character belongs to one class.

Every intervening point in the source example string 410 that is between characters in two different equivalence classes forms a transition point which is represented by the vertical bars in string 410.

The only exception occurs when a single uppercase character is followed by a sequence of lowercase characters, e.g., "Presentations," in that case, there is no transition point.

The transition points partition the string 410 into an ordered list of tokens. To restrict the number of possible patterns, only "meaningful" patterns, whose constant strings are composed of a series of whole tokens, are considered as candidate patterns. All non-alphanumeric tokens (e.g., '/'-'.' and '?') are considered preferred tokens. The first and last token in the string is considered a preferred token as well. If a pattern's constant string begins or ends in a preferred token, then bonus points are earned and the correlation score is increased to prefer this pattern over others.

Determining Correlation Scores

To determine the correlation score of a pattern, the pattern is matched with each of the examples in the correlation set. The score is given by formulation [1] above.

The invention defines a match of a pattern with a target string in two ways; full matching and token matching.

Full matching involves matching at the character level. Characters in the pattern are matched with corresponding characters in the target example string (resource address or URL). Tokens in the pattern need not match tokens in the target. Token matching involves matching at the token level. The target string is tokenized and tokens in the pattern and the target are matched.

Token matching consumes less time than full matching, and is likely to be more effective when the walking rule is used in an actual crawl. However, while the patterns generated by the system are composed of whole tokens, this may not hold after the user has edited the rule. Hence, token matching cannot be used unless user editing is disallowed or disabled. This may be given as an option to the user. Efficient implementations for both cases are discussed below.

Computing Correlation Scores with Full Character Matching

All candidate patterns (prefix, suffix, infix and prefix-suffix) are enumerated and scored against every example in the current correlation set. Two efficiency measures can be used while scoring: search pruning, and caching.

Search Space Pruning

With search pruning, prefix and suffix patterns are enumerated in the order of increasing length. In the case of infix patterns, those starting at a given token are enumerated in the order of increasing length, as are prefix-suffix patterns whose prefix string ends at a given token. Each of these enumerations is called a sub-enumeration. A sub-enumeration can be terminated when the current pattern matches no negative examples in phase I or no positive examples in phase II, and the last token added was a preferred token. This condition ensures that the score will not increase further in the sub-enumeration.

Caching

Figure 5:
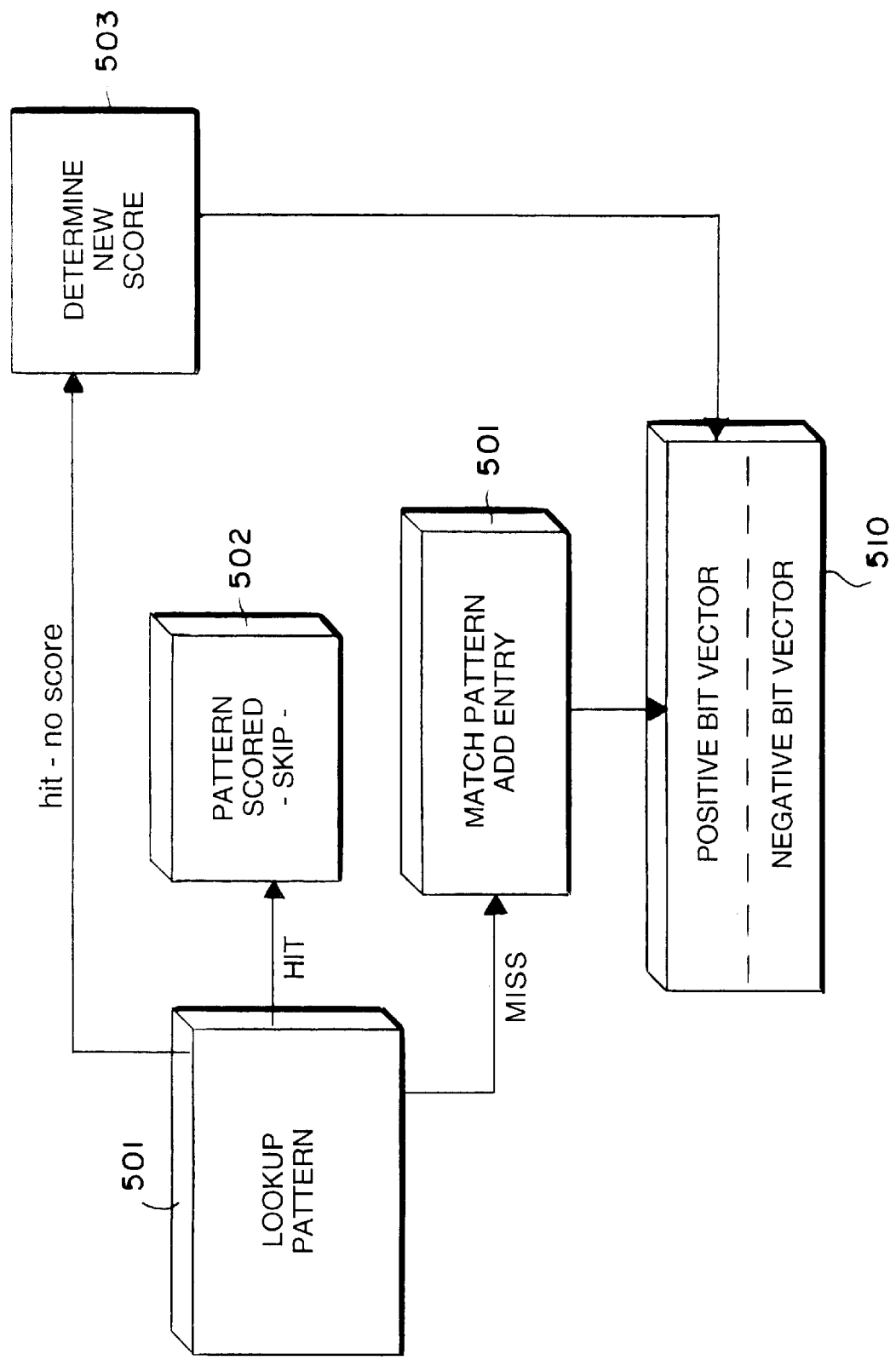
FIG. 5 is a flow diagram of steps for determining correlation scores based on full character string matching.

As shown in FIG. 5, when the correlation score of a pattern is first determined, the positive and negative examples that were matched are stored in a hash-table as a pair of bit vectors 510, i.e., bit i of the positive and negative bit-vectors shows if the pattern matched the ith positive/negative example. The hash-table entry also stores the last iteration in which the score was determined.

When determining the score of a pattern, first, a lookup 501 is done on the hash-table 510. If the pattern is not present (miss), then the pattern is matched against the correlation set and a new entry is added to the hash-table in step 501. If the pattern is present and the score was determined previously in the same iteration (hit), then the pattern is skipped in step 502. Otherwise, if the pattern is present but not scored in the current iteration, then a new score is determined from the stored bit vectors in step 503.

Because the correlation set only tends to shrink in size, only the bits that correspond to the elements in the current correlation set are relevant in determining the score. The value of these bits does not change over iterations; hence, the value stored in the cached bit-vector can be used. The hash-table 510 is cleared before beginning phase II.

Determining Correlation Scores with Token Matching

Figure 6:
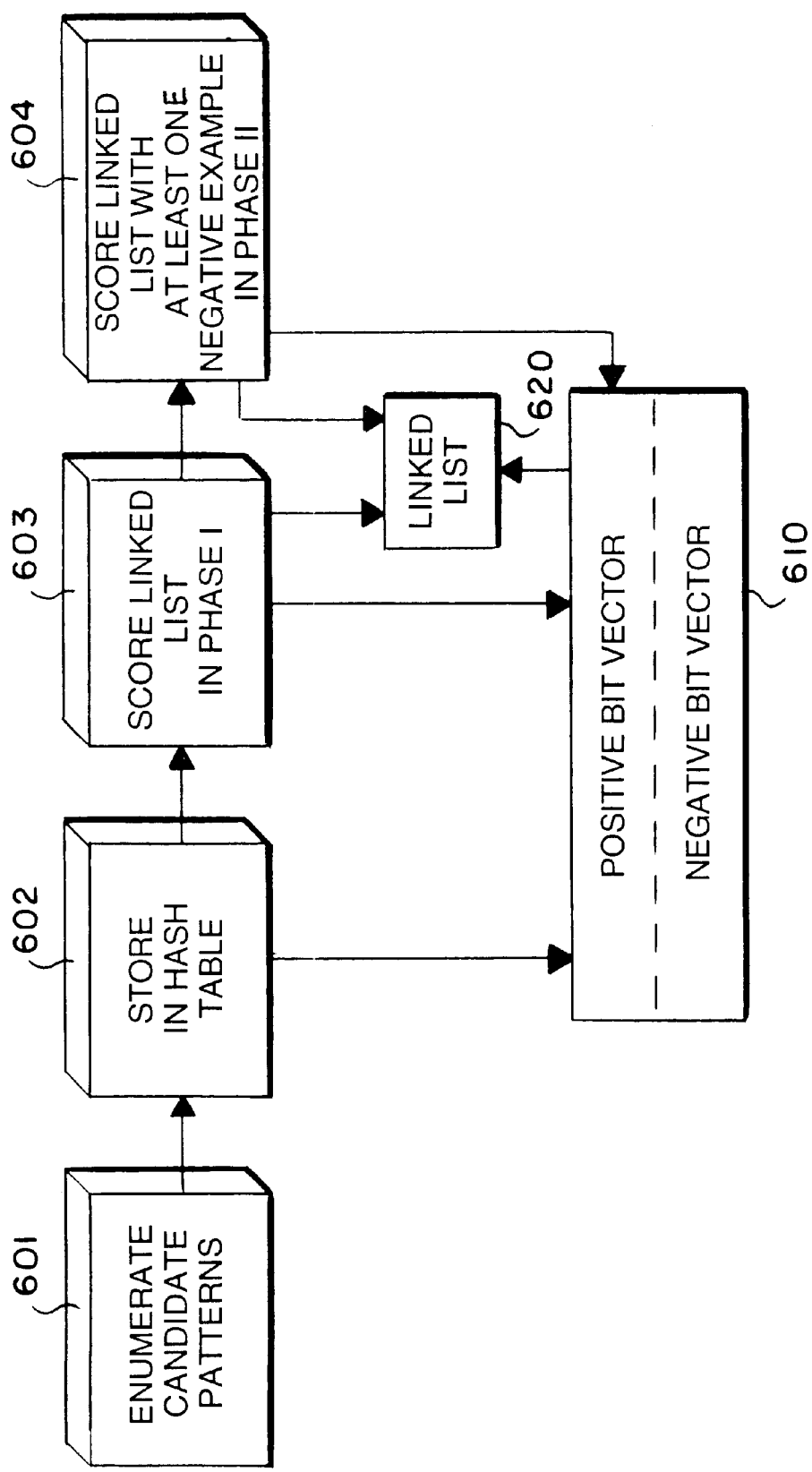
FIG. 6 is a flow diagram of steps for determining correlation scores based on token matching.

FIG. 6 shows the steps of a method for determining correlation scores using token matching. In this embodiment, the target pattern is tokenized, and patterns on tokens are compared. This allows for an efficient implementation. First, in step 601, all candidate patterns from each of the examples are enumerated. One entry for each unique pattern thus derived is stored in a hash-table 610 in step 602. The entry contains a pair of bit-vectors representing positive and negative examples, as in the previous case.

When a pattern is enumerated from an example, the corresponding bit in the hash-table entry is set. At the end of this process, each hash-table entry stores the set of examples that are matched by the corresponding pattern based on token matching.

In the beginning of phase I, all hash-table entries that have at least one positive match are collected in a linked list. In each iteration, the linked-list is processed, from beginning to end in step 603, and the correlation score for each entry is determined based on the current correlation set and the bit vectors. Entries which do not match any positive examples in the correlation set are removed from the linked-list. At the end of the pass, the entry with the highest correlation score is found and the correlation set is reduced correspondingly.

In phase II, the same process is repeated in step 604, except all entries in the linked-list must match at least on negative example in the correlation set at all times.

Note, if token matching is the matching technique used in developing the walking rule, the same technique must be used when matching against target URL strings subsequently in an actual crawl.

Advantages of Interactive Walking Rule Specification

The present invention has the following advantages over the prior art. Users can train a Web crawler to learn a walking rule without having programming skills or manually coding expressions. The interactive approach by iterative rule refinement can provide for a walking rule of any desired scope. The present approach to rule inference improves on grammar inference and decision tree learning techniques because the rules the system learns have a simple structure that can be expressed in a manner that is intelligible to end-users. As another advantage, the invention can infer useful patterns from a small number of examples, and takes advantage of negative examples as well. Prior art approaches that use grammar inference require a large set of positive examples, and produces patterns that closely fit the data without much generalization.

The present invention has biases specific to the domain of URL strings, and selectively chooses patterns that represent useful generalizations. Hence, in the context of the Web, the present invention is likely to be more effective than general-purpose algorithms for pattern inference on strings.

The foregoing description has been directed to specific embodiments of this invention. It will be apparent, however, that variations and modifications may be made to the described embodiments, with the attainment of all or some of the advantages. Therefore, it is the object of the appended claims to cover all such variations and modifications as come within the spirit and scope of the invention.

We claim:

1. A computer implemented method for searching a network for resources, where each resource has an associated address specified as a character string and resources are connected by links in the form of the addresses, comprising:

searching the network to locate an initial set of resources in accordance with a defined scope;

receiving data identifying positive and negative examples from the initial set of resources;

inferring a rule from the positive and negative examples to limit the scope wherein the rule comprises patterns of character strings representing addresses; and performing a subsequent search of the network according to the scope as limited by the inferred rule to locate a subsequent set of resources.

2. The method of claim 1, including storing the subsequent set of resources as the initial set of resources and repeating the receiving, inferring, and performing to allow iterative refinement of the rule.

3. The method of claim 1 including defining a start set, a host restriction, a crawl order, a depth for searching, and a resource limit number for limiting the scope of the searching.

4. The method of claim 1 wherein the rule includes positive patterns and negative patterns of character strings representing addresses.

5. The method of claim 4 wherein a particular pattern can have one of the forms A, *, A *, *B, A *B, and *A *, where A and B represent constant character strings, and * represents some arbitrary pattern of characters, including none.

6. The method of claim 1 including matching candidate address patterns with addresses of as many as possible positive examples and the fewest possible negative examples in a first phase; and matching candidate address patterns with addresses of as many as possible negative examples and no positive examples in a second phase.

7. The method of claim 6 including matching the rule and the patterns to determine correlation scores.

8. The method of claim 7 including selecting patterns to maximize the correlation scores.

9. The method of claim 8 including partitioning the address of each resource into tokens at transition points.

10. The method of claim 9 wherein the characters of each address are assigned to equivalence classes, and transitions points are between characters assigned to different equivalence classes except when a single uppercase character is followed by a sequence of lowercase characters.

11. The method of claim 9 wherein the first, last, and all non-alphanumeric tokens are designated preferred tokens whereby the correlation score is increased if a particular pattern includes preferred tokens.

12. The method of claim 6 wherein the matching is done character by character.

13. The method of claim 6 wherein the matching is done token by token.

14. The method of claim 1 wherein the resources are Web pages.

15. The method of claim 1, including rendering the rule and information of a subset of the initial set of resources that match the rule, wherein the subset of the initial set of resources includes resources other than the positive examples.

16. The method of claim 15, including storing the subsequent set of resources as the initial set of resources and repeating the receiving, inferring, rendering, and performing to allow iterative refinement of the rule.

17. The method of claim 15, including specifying a scope modifier for the rule.

18. The method of claim 17 wherein the scope modifier is stored as a first integer value to be applied to the positive examples and a second integer value applied to the negative examples.

19. The method of claim 17, including storing the subsequent set of resources as the initial set of resources and repeating the receiving, inferring, rendering, specifying, and performing to allow iterative refinement of the rule.

20. The method of claim 17, including storing the subsequent set of resources as the initial set of resources and repeating the rendering, specifying, and performing to allow iterative refinement of the rule.

21. The method of claim 15, including, prior to performing the subsequent search, enabling a user to edit the rule to produce an edited rule; and wherein the subsequent search is performed according to the scope as limited by the edited rule to locate the subsequent set resources.

22. The method of claim 21, wherein the enabling includes enabling the user to add and delete positive examples and negative examples.

23. The method of claim 22, including storing the subsequent set of resources as the initial set of resources and repeating the inferring, rendering, enabling, and performing to allow iterative refinement of the rule.

24. The method of claim 21, including storing the subsequent set of resources as the initial set of resources and repeating the rendering, enabling, and performing to allow iterative refinement of the rule.

25. The method of claim 15 including rendering resource specific information including a title, an address, and a summary of the resource.

26. The method of claim 15 wherein the network connects client computers and server computers, and the client computer performs the searching, receiving, inferring, rendering, and performing and the server computers store the resources at the associate addresses.

27. A computer program product for use in conjunction with a computer system, the computer program product comprising a computer readable storage medium and a computer program mechanism embedded therein, the computer program mechanism comprising:

search instructions for searching a network to locate an initial set of resources in accordance with a defined scope wherein each resource has an associated address specified as a character string;

rule generating instructions for receiving data identifying positive and negative examples from the initial set of resources, and for inferring a rule from the positive and negative examples to limit the scope wherein the rule comprises patterns of character strings representing addresses; and subsequent search instructions for performing a subsequent search of the network according to the scope as limited by the inferred rule to locate a subsequent set resources.

28. The computer program product of claim 27 including storing instructions for storing the subsequent set of resources as the initial set of resources and iterative refinement instructions for repeating the rule generating instructions and subsequent search instructions.

29. The computer program product of claim 27 including scope defining instructions for receiving a start set, a host restriction, a crawl order, a depth for searching, and a resource limit number for limiting the scope of the searching.

30. The computer program product of claim 27 wherein the rule includes positive patterns and negative patterns of character strings representing addresses.

31. The computer program product of claim 30 wherein a particular pattern can have one of the forms A, *, A *, *B, A *B, and *A *, where A and B represent constant character strings, and * represents some arbitrary pattern of characters, including none.

32. The computer program product of claim 27 including first phase matching instructions for matching candidate address patterns with addresses of as many as possible positive examples and the fewest possible negative examples; and second phase matching instructions for matching candidate address patterns with addresses of as many as possible negative examples and no positive examples.

33. The computer program product of claim 32 including correlation instructions for matching the rule and the patterns to determine correlation scores and selecting patterns to maximize the correlation scores.

34. The computer program product of claim 33 including token instructions for partitioning the address of each resource into tokens at transition points wherein the first, last, and all non-alphanumeric tokens are designated preferred tokens whereby the correlation score is increased if a particular pattern includes preferred tokens.

35. The computer program product of claim 32 wherein the first phase matching instructions and the second phase matching instructions match candidate address patterns with addresses character by character.

36. The computer program product of claim 32 wherein the first phase matching instructions and the second phase matching instructions match candidate address patterns with addresses token by token.

37. The computer program product of claim 27 including rendering instructions for rendering the rule and information of a subset of the initial set of resources that match the rule, wherein the subset of the initial set of resources includes resources other than the positive examples.

38. The computer program product of claim 37 including storing instructions for storing the subsequent set of resources as the initial set of resources and rule refinement instructions for repeating the rule generating instructions, rendering instructions and subsequent search instructions.

39. The computer program product of claim 37 including modifier instructions for receiving a scope modifier for the rule wherein the scope modifier is stored as a first integer value to be applied to the positive examples and a second integer value applied to the negative examples.

40. The computer program product of claim 39 including storing instructions for storing the subsequent set of resources as the initial set of resources and rule refinement instructions for repeating the rule generating instructions, rendering instructions, modifier instructions, and subsequent search instructions.

41. The computer program product of claim 39 including storing instructions for storing the subsequent set of resources as the initial set of resources and rule refinement instructions for repeating the rendering instructions, modifier instructions, and subsequent search instructions.

42. The computer program product of claim 37 including user editing instructions to allow the user to edit the rule to produce an edited rule; and wherein the subsequent search instructions perform a subsequent search of the network according to the scope as limited by the edited rule to locate a subsequent set resources.

43. The computer program product of claim 42 wherein the user editing instructions include instructions to allow the user to add and delete positive examples and negative examples.

44. The computer program product of claim 43 including storing instructions for storing the subsequent set of resources as the initial set of resources and rule refinement instructions for repeating the rule generating instructions, rendering instructions, user editing instructions, and subsequent search instructions.

45. The computer program product of claim 42 including storing instructions for storing the subsequent set of resources as the initial set of resources and rule refinement instructions for repeating the rendering instructions, user editing instructions, and subsequent search instructions.

46. The computer program product of claim 37 wherein the rendering instructions include instructions for rendering resource specific information including a title, an address, and a summary of the resource.

47. A computer system comprising:

a central processing unit (CPU) for executing instructions; and program instructions, stored in a memory and executable by the CPU, comprising:

search instructions for searching a network to locate an initial set of resources in accordance with a defined scope wherein each resource has an associated address specified as a character string;

rule generating instructions for receiving data identifying positive and negative examples from the initial set of resources, and for inferring a rule from the positive and negative examples to limit the scope wherein the rule comprises patterns of character strings representing addresses; and subsequent search instructions for performing a subsequent search of the network according to the scope as limited by the inferred rule to locate a subsequent set resources.

48. The computer system of claim 47 including storing instructions for storing the subsequent set of resources as the initial set of resources and iterative refinement instructions for repeating the rule generating instructions and subsequent search instructions.

49. The computer system of claim 47 including scope defining instructions for receiving a start set, a host restriction, a crawl order, a depth for searching, and a resource limit number for limiting the scope of the searching.

50. The computer system of claim 47 wherein the rule includes positive patterns and negative patterns of character strings representing addresses.

51. The computer system of claim 50 wherein a particular pattern can have one of the forms A, *, A *, *B, A *B, and *A *, where A and B represent constant character strings, and * represents some arbitrary pattern of characters, including none.

52. The computer system of claim 47 including first phase matching instructions for matching candidate address patterns with addresses of as many as possible positive examples and the fewest possible negative examples; and second phase matching instructions for matching candidate address patterns with addresses of as many as possible negative examples and no positive examples.

53. The computer system of claim 52 including correlation instructions for matching the rule and the patterns to determine correlation scores and selecting patterns to maximize the correlation scores.

54. The computer system of claim 53 including token instructions for partitioning the address of each resource into tokens at transition points wherein the first, last, and all non-alphanumeric tokens are designated preferred tokens whereby the correlation score is increased if a particular pattern includes preferred tokens.

55. The computer system of claim 52 wherein the first phase matching instructions and the second phase matching instructions match candidate address patterns with addresses character by character.

56. The computer system of claim 52 wherein the first phase matching instructions and the second phase matching instructions match candidate address patterns with addresses token by token.

57. The computer system of claim 47 including a display device and rendering instructions for rendering the rule and information of a subset of the initial set of resources that match the rule on the display device, wherein the subset of the initial set of resources includes resources other than the positive examples.

58. The computer system of claim 57 including storing instructions for storing the subsequent set of resources as the initial set of resources and rule refinement instructions for repeating the rule generating instructions, rendering instructions and subsequent search instructions.

59. The computer system of claim 57 including modifier instructions for receiving a scope modifier for the rule wherein the scope modifier is stored as a first integer value to be applied to the positive examples and a second integer value applied to the negative examples.

60. The computer system of claim 59 including storing instructions for storing the subsequent set of resources as the initial set of resources and rule refinement instructions for repeating the rule generating instructions, rendering instructions, modifier instructions, and subsequent search instructions.

61. The computer system of claim 59 including storing instructions for storing the subsequent set of resources as the initial set of resources and rule refinement instructions for repeating the rendering instructions, modifier instructions, and subsequent search instructions.

62. The computer system of claim 57 including user editing instructions to allow the user to edit the rule to produce an edited rule; and wherein the subsequent search instructions perform a subsequent search of the network according to the scope as limited by the edited rule to locate a subsequent set resources.

63. The computer system of claim 62 wherein the user editing instructions include instructions to allow the user to add and delete positive examples and negative examples.

64. The computer system of claim 63 including storing instructions for storing the subsequent set of resources as the initial set of resources and rule refinement instructions for repeating the rule generating instructions, rendering instructions, user editing instructions, and subsequent search instructions.

65. The computer system of claim 62 including storing instructions for storing the subsequent set of resources as the initial set of resources and rule refinement instructions for repeating the rendering instructions, user editing instructions, and subsequent search instructions.

66. The computer system of claim 57 wherein the rendering instructions include instructions for rendering resource specific information including a title, an address, and a summary of the resource.

* * * * *